(12) United States Patent
Krasner

(10) Patent No.: US 8,078,118 B2
(45) Date of Patent: Dec. 13, 2011

(54) METHOD AND APPARATUS FOR SIGNAL PROCESSING IN A SATELLITE POSITIONING SYSTEM USING NAVIGATION MESSAGE COMMON INFORMATION

(75) Inventor: Norman F. Krasner, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/689,922

(22) Filed: Jan. 19, 2010

(65) Prior Publication Data

US 2010/0182197 A1 Jul. 22, 2010

Related U.S. Application Data

(63) Continuation of application No. 10/756,947, filed on Jan. 13, 2004, now Pat. No. 7,650,156, which is a continuation of application No. 09/074,021, filed on May 6, 1998, now Pat. No. 6,816,710.

(51) Int. Cl.
*H04W 24/00* (2009.01)
*G01S 19/42* (2010.01)
*H04L 7/00* (2006.01)
*H04B 7/185* (2006.01)

(52) U.S. Cl. .................... 455/73; 455/456.1; 455/456.6; 342/357.63

(58) Field of Classification Search ............. 342/357.63, 342/357.12, 357.1, 357.25, 357.42; 455/73, 455/456.1, 456.6; 375/150; 701/214
See application file for complete search history.

(56) References Cited

U.S. PATENT DOCUMENTS

| 4,463,357 A | 7/1984 | MacDoran |
| 4,744,083 A | 5/1988 | O'Neill et al. |
| 4,972,431 A | 11/1990 | Keegan |
| 5,119,225 A | 6/1992 | Grant et al. |
| 5,223,843 A | 6/1993 | Hutchinson |
| 5,303,286 A | 4/1994 | Wiedeman |
| 5,459,763 A | 10/1995 | Hori et al. |
| 5,640,452 A | 6/1997 | Murphy |
| 5,663,734 A | 9/1997 | Krasner |
| 5,694,417 A | 12/1997 | Andren et al. |
| 5,739,785 A | 4/1998 | Allison et al. |
| 5,748,651 A | 5/1998 | Sheynblat |

(Continued)

FOREIGN PATENT DOCUMENTS

EP 0438199 7/1991

(Continued)

OTHER PUBLICATIONS

Farrell, Givargis & Barth, "Real-Time Differential Carrier Phase GPS-Aided INS," IEEE Transactions on Control Systems Technology, vol. 8, No. 4, Jul. 2000, pp. 709-721.

(Continued)

*Primary Examiner* — William D Cumming
(74) *Attorney, Agent, or Firm* — Linda Gunderson

(57) ABSTRACT

A method and apparatus for processing satellite positioning system (SPS) signals which are weak in level. In one embodiment, a SPS receiver receives at least two signal samples representing, at least in part, common information, wherein the two signal samples are associated with one or more satellite messages. By combining the two signal samples, navigation information (e.g., time, position, velocity, etc.) may be determined based on the combination of the two signal samples. According to another embodiment, the two signal samples are differentially demodulated and summed together to form the combination.

25 Claims, 9 Drawing Sheets

U.S. PATENT DOCUMENTS

| | | |
|---|---|---|
| 5,812,087 A | 9/1998 | Krasner |
| 5,913,170 A | 6/1999 | Wortham |
| 5,963,582 A | 10/1999 | Stansell, Jr. |
| 6,009,551 A | 12/1999 | Sheynblat |
| 6,034,989 A | 3/2000 | Kochi et al. |
| 6,108,317 A | 8/2000 | Jones et al. |
| 6,160,841 A | 12/2000 | Stansell, Jr. et al. |
| 6,208,291 B1 | 3/2001 | Krasner |
| 6,215,441 B1* | 4/2001 | Moeglein et al. ........ 342/357.25 |
| 6,289,041 B1 | 9/2001 | Krasner |
| 6,363,123 B1 | 3/2002 | Balodis |
| 6,411,254 B1* | 6/2002 | Moeglein et al. ........ 342/357.42 |
| 6,538,601 B2* | 3/2003 | Bruno et al. ............. 342/357.42 |
| 6,816,710 B2* | 11/2004 | Krasner ......................... 455/73 |
| 7,408,504 B2* | 8/2008 | Kishimoto et al. ...... 342/357.63 |
| 7,650,156 B2* | 1/2010 | Krasner ..................... 455/456.1 |
| 7,949,351 B2* | 5/2011 | Zou et al. .................. 455/456.6 |
| 2002/0024461 A1* | 2/2002 | Moeglein et al. ........... 342/357.1 |
| 2002/0135510 A1* | 9/2002 | Bruno et al. ............. 342/357.1 |
| 2004/0189515 A1 | 9/2004 | Vannucci |
| 2005/0037775 A1 | 2/2005 | Moeglein et al. |
| 2009/0082036 A1* | 3/2009 | Zou et al. ................... 455/456.1 |
| 2009/0228209 A1* | 9/2009 | Alanen et al. ................ 701/214 |
| 2010/0182197 A1* | 7/2010 | Krasner ................... 342/357.25 |
| 2010/0278220 A1* | 11/2010 | Weill ............................ 375/150 |
| 2011/0007783 A1* | 1/2011 | Weill ............................ 375/150 |

FOREIGN PATENT DOCUMENTS

| | | |
|---|---|---|
| EP | 0601293 | 6/1994 |
| JP | 02069032 | 3/1990 |
| JP | 07104050 | 4/1995 |
| JP | 09172393 | 6/1997 |
| JP | 10107686 | 4/1998 |
| JP | 11304899 A | 11/1999 |
| WO | WO9740398 A2 | 10/1997 |
| WO | WO9834164 A1 | 8/1998 |
| WO | WO9859257 A1 | 12/1998 |

OTHER PUBLICATIONS

International Search Report—PCT/US1999/008084, International Searching Authority—European Patent Office—Sep. 30, 1999.

Translation of Office Action in Japan application 2000-547486 corresponding to U.S. Appl. No. 12/689,922, citing JP11304899 dated Mar. 22, 2011.

Written Opinion—PCT/US1999/008084, IPEA/US, Mar. 20, 2000.

* cited by examiner $D_1 = d_1 \oplus D_{30}^*$ $D_2 = d_2 \oplus D_{30}^*$ $D_3 = d_3 \oplus D_{30}^*$

...

$D_{24} = d_{24} \oplus D_{30}^*$ $D_{25} = D_{29}^* \oplus d_1 \oplus d_2 \oplus d_3 \oplus d_6 \oplus d_8 \oplus d_{10} \oplus d_{11} \oplus d_{12} \oplus d_{13} \oplus d_{14} \oplus d_{17} \oplus d_{18} \oplus d_{20} \oplus d_{23}$ $D_{26} = D_{30}^* \oplus d_2 \oplus d_3 \oplus d_4 \oplus d_6 \oplus d_7 \oplus d_{11} \oplus d_{12} \oplus d_{13} \oplus d_{14} \oplus d_{15} \oplus d_{18} \oplus d_{19} \oplus d_{21} \oplus d_{24}$ $D_{27} = D_{29}^* \oplus d_1 \oplus d_3 \oplus d_4 \oplus d_6 \oplus d_7 \oplus d_8 \oplus d_{12} \oplus d_{13} \oplus d_{14} \oplus d_{15} \oplus d_{16} \oplus d_{19} \oplus d_{20} \oplus d_{22}$ $D_{28} = D_{30}^* \oplus d_2 \oplus d_4 \oplus d_5 \oplus d_6 \oplus d_8 \oplus d_9 \oplus d_{13} \oplus d_{14} \oplus d_{15} \oplus d_{16} \oplus d_{17} \oplus d_{20} \oplus d_{21} \oplus d_{23}$ $D_{29} = D_{30}^* \oplus d_1 \oplus d_3 \oplus d_5 \oplus d_6 \oplus d_7 \oplus d_9 \oplus d_{10} \oplus d_{14} \oplus d_{15} \oplus d_{16} \oplus d_{17} \oplus d_{18} \oplus d_{21} \oplus d_{22} \oplus d_{24}$ $D_{30} = D_{29}^* \oplus d_3 \oplus d_5 \oplus d_6 \oplus d_8 \oplus d_9 \oplus d_{10} \oplus d_{11} \oplus d_{13} \oplus d_{15} \oplus d_{19} \oplus d_{22} \oplus d_{23} \oplus d_{24}$

WHERE:

$d_1, d_2, ...$ ARE THE SOURCE DATA BITS

THE SYMBOL * IS USED TO IDENTIFY THE LAST 2 BITS OF THE PREVIOUS WORD OF THE SUBFRAME $D_{25}, ... D_{30}$ ARE THE COMPUTED PARITY BITS $D_1, D_2, ... D_{30}$ ARE THE BITS TRANSMITTED BY THE SATELLITE $\oplus$ IS THE MODULO-2 OR EXCLUSIVE-OR OPERATION

FIG. 2B

METHOD AND APPARATUS FOR SIGNAL PROCESSING IN A SATELLITE POSITIONING SYSTEM USING NAVIGATION MESSAGE COMMON INFORMATION

RELATED APPLICATIONS

This application is a continuation of U.S. patent application Ser. No. 10/756,947, now U.S. Pat. No. 7,650,156, filed on Jan. 13, 2004, which is a continuation of U.S. patent application Ser. No. 09/074,021, now U.S. Pat. No. 6,816,710, filed on May 6, 1998, and incorporated herein by reference in their entirety for all purposes.

BACKGROUND OF THE INVENTION

1. Field of the Invention

This invention relates to systems which utilize received signals from satellite positioning systems (SPS) to determine navigational information (e.g., position, time, distance, velocity, etc.).

2. Background of the Invention

SPS receivers such as GPS (Global Positioning Satellite) system receivers normally determine their position by computing relative times of arrival of signals transmitted simultaneously from a multiplicity of satellites such as GPS (or NAVSTAR) satellites. These satellites transmit, as part of their satellite data message, both satellite positioning data as well as data on clock timing, so-called "ephemeris" data. In addition they transmit time-of-week (TOW) information that allows the receiver to determine unambiguously local time. Each received GPS signal (in C/A mode) is constructed from a high rate (1.023 MHz) repetitive pseudorandom (PN) pattern of 1023 symbols, commonly called "chips." Further imposed on this "spreading sequence" pattern is low rate data at a 50 Hz (or baud) rate. This data is the source of the above-mentioned TOW information.

Typically, an SPS receiver computes one or more "pseudorange" measurements, each of which represents the range between the receiver and a satellite vehicle (SV). The term "pseudorange" is generally used to point out that the range measurement may include error due to one or more factors, including, for example, the error between time as indicated by the clock of the SPS receiver and a reference time, such as the reference time associated with the more accurate atomic clock of the satellites. Thus, the SPS receiver typically uses the pseudoranges, along with timing and ephemeris data provided in the satellite signal to determine a more accurate set of navigational data, such as position, time, and/or range.

To complete computation of the navigational information, such as the position of the SPS receiver, the SPS receivers should generally process the 50 baud data. To process the 50 baud data, the satellite signal level received by the SPS receiver should be sufficiently strong. Thus, conventional SPS receivers may not be able to completely determine navigational information, such as their position and/or time, if the received signal level and/or signal-to-noise ratio (SNR) is too low. Unfortunately, in some situations, such as where there is blockage of the satellite signals, the received signal level from the GPS satellites may be too low to demodulate and read the satellite data signals without error. Such situations may arise in personal tracking and/or other mobile applications.

The present invention provides a signal processing method and apparatus for improving the sensitivity of an entity, such as a mobile satellite positioning system (SPS) receiver, to better enable processing of the satellite message and determination of navigational information, such as time, position, etc., in mobile and/or other environments wherein noise and/or other factors may diminish signal strength, SNR, etc.

SUMMARY OF THE INVENTION

A method and apparatus for processing satellite positioning system (SPS) signals is provided. In one embodiment, a SPS receiver receives at least two signal samples representing, at least in part, common information, wherein the two signal samples are associated with one or more satellite messages. By combining the two signal samples, navigational information contained in the samples (e.g., time, position, velocity, etc.) may be determined based on the combination of the two signal samples. According to another embodiment, the two signal samples are differentially demodulated and summed together to form the combination.

BRIEF DESCRIPTION OF THE DRAWINGS

FIG. 2B illustrates the GPS coding equations generally used to code source data (e.g., ephemeris) for transmission by satellites;

DETAILED DESCRIPTION

Figure 1:
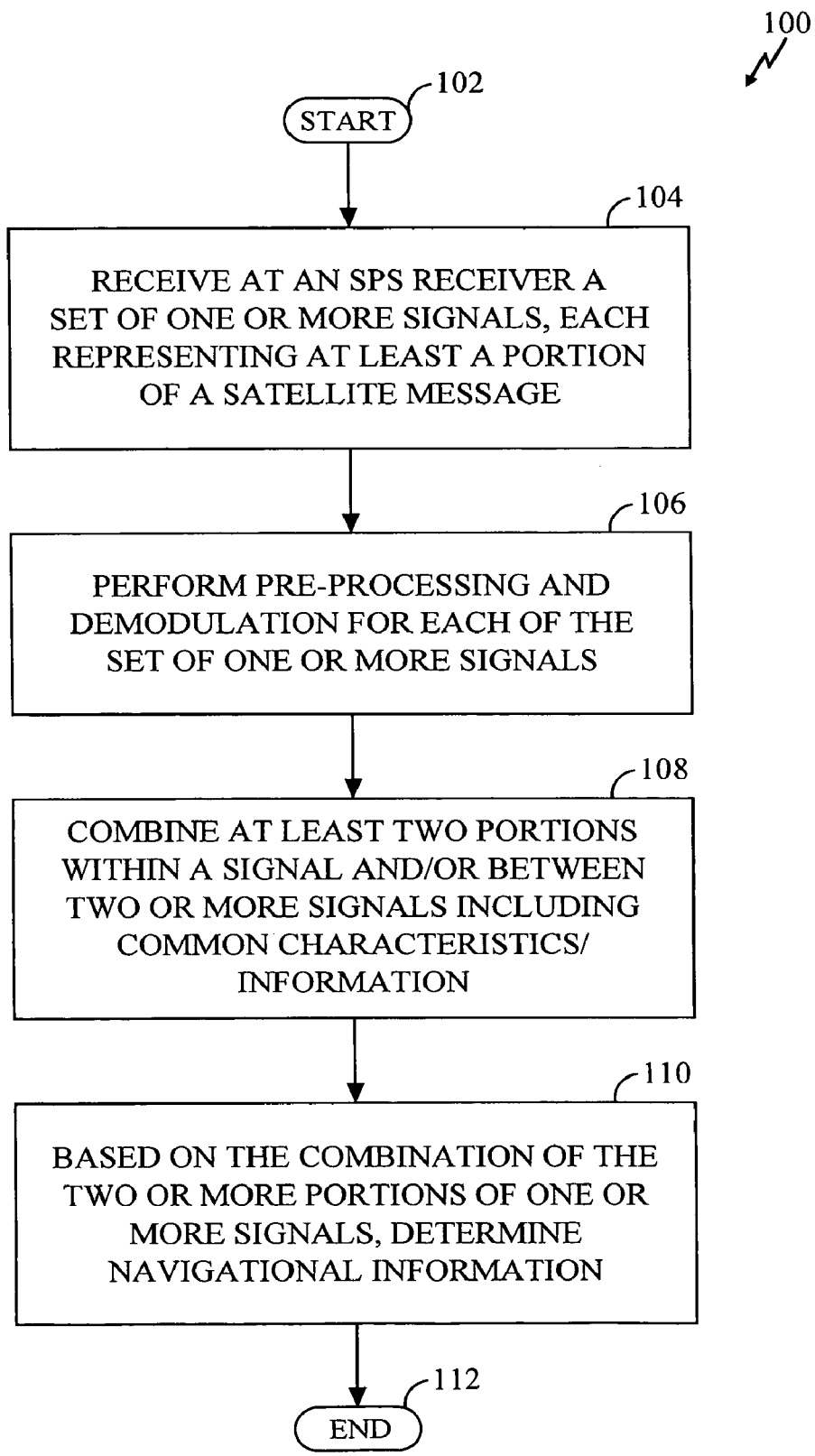
FIG. 1 is a flow diagram illustrating a method for processing of satellite positioning information according to one embodiment of the invention.

Various methods and apparatuses for processing satellite messages for use with satellite positioning systems are described below. Some of the discussion of the invention focuses upon the United States Global Positioning Satellite (GPS) system. However, it should be evident that these methods are equally applicable to similar satellite positioning systems, such as the Russian Glonass system. Moreover, it will be appreciated that the teachings of the present invention are equally applicable to positioning systems which utilize pseudolites or a combination of satellites and pseudolites. Moreover, the various architectures for basestations and mobile SPS receivers described herein are provided for illustrative purposes rather than to be construed as limitations of the present invention. Thus, it should be appreciated that the present invention could find use in a number of satellite positioning systems, and may be implemented in a number of different device and/or algorithmic architectures.

Overview of the Invention

According to one aspect of the invention, a method and apparatus is provided for improving the sensitivity of a satellite positioning system (SPS) receiver. According to one embodiment, the present invention provides such improved sensitivity by combining common information within a satellite vehicle (SV) signal (hereinafter referred to as "intra-SV" signal processing). According to another embodiment of the invention, common data between two or more SV signal(s) is combined (hereinafter referred to as "inter-SV" signal processing). In yet another embodiment, a combination of intra-SV and inter SV signal processing is performed. Such common information may be data that is transmitted as part of the message of one or more satellite vehicles (SVs) and/or one or more characteristics of the signal(s) associated with the satellite message(s). It will be understood that "common" information is typically information that is identical in both parts of the message from one or more SVs.

It should be appreciated that several types of SPS receivers may embody the present invention. For example, in one embodiment, the SPS receiver may be a mobile unit. In another embodiment, the SPS receiver may be integrated with other circuitry, such as a communications subsystem, to communicate with other entities, such as a basestation. In such an embodiment, the basestation may include its own SPS receiver, and perform some of the signal processing methods described herein exclusively, and/or in conjunction with another SPS receiver, which may be mobile. The communications subsystem, in one embodiment, may configured to provide analog and/or digital cellular communications between the SPS receiver and another entity. Although the invention may be utilized in various environments, the sensitivity gain that may be provided by the invention may be especially useful in mobile and/or other environments wherein SNR may be too low for a conventional SPS receiver to provide adequate processing of satellite signals.

Overview of One Embodiment of the Invention

FIG. 1 is a flow diagram illustrating a method for performing intra-SV and/or inter-SV signal processing, according to one embodiment of the invention. The method of FIG. 1 may provide improved sensitivity of a satellite positioning receiver, for example, when signal-to-noise ratio (SNR) is relatively low. In the method 100 shown in FIG. 1, flow begins at 102 and ends at 112. At 104, an entity, which in one embodiment comprises a mobile SPS receiver, receives a set of one or more signals associated with a satellite positioning system, wherein each of the set of one or more signals represents at least a portion of a satellite vehicle's transmitted message, such as the GPS message 212 shown in FIG. 2A.

At 106, the set of one or more satellite signals are pre-processed. In one embodiment where GPS signals are processed by the entity, the pre-processing involves removal of the pseudorandom noise (PN) from the received signal(s) (i.e., "despreading" the received set of one or more signals) to obtain a relatively narrowband data signal. This narrowband data signal is then demodulated for each of the set of one or more received signals. In one embodiment, the narrowband data for each of the set of signals is differentially demodulated as part of the pre-processing. Differential demodulation, as described in further detail below, involves multiplying a data sample (e.g., a bit) of a satellite message data stream with a previous or delayed data sample (or the complex conjugate of the delayed data sample, depending on the format of the received satellite signal). As such, differential demodulation may remove constant or relatively slow varying carrier phase from the received satellite signal. By removing such phase, differential demodulation may reduce the need to track the carrier phase of the satellite signal to a relatively high degree of precision, which is especially advantageous in mobile or other operating environments wherein there may be appreciable phase noise present on the receiver carrier. Differential demodulation is explained in further detail below with reference to FIG. 3.

At 108, common information for at least two portions of one SV signal (or portion thereof) and/or at least two portions between two or more SV signals is combined. For example, in one embodiment, where only a signal associated with one SV is considered, i.e., intra-SV signal processing is performed, disjoint portions of the demodulated signal may be combined (e.g., through summation) with one another, as described in further detail below. For example, such common portions may be frames (or portions thereof) included in a satellite message, such as the message 212 shown in FIG. 2A. If such portions represent common data (e.g., due to signal periodicity), then the combination of the common data may provide, according to one aspect of the invention, an improvement in signal-to-noise ratio (SNR). In one embodiment, the common data may include satellite ephemeris data, which is typically repeated every thirty seconds in a GPS system. In alternative embodiments, other common portions of a satellite signal may be determined and combined.

Additionally, according to another embodiment of the invention, two or more common portions of two or more SV signals may be combined (i.e., inter-SV signal processing). The two or more common portions may include data associated with a particular instance of time, for example. As such, such data may be common across any number of satellite vehicle messages. In one embodiment, the common data may represent time of week (TOW), Almanac, and or other common information between a set of satellite message(s). Again, by combining this common data, across a number of satellite signals, the present invention, in one embodiment, may further improve signal-to-noise ratio associated with this common data. For example, summation of the data transmitted by seven satellites could provide a sensitivity gain of up to 8.45 dB.

Figure 2A:
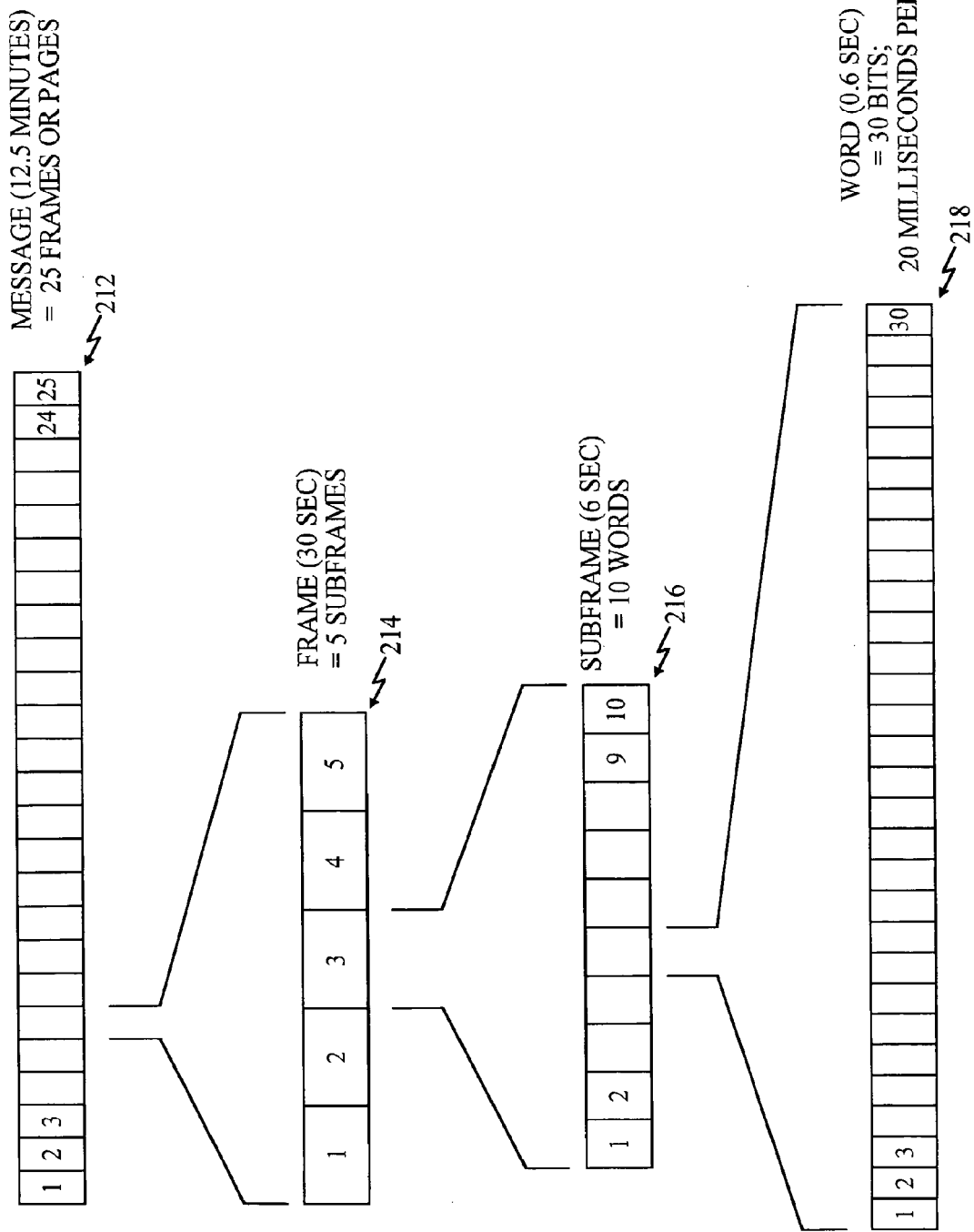
FIG. 2A depicts the structure of a (standard positioning service) GPS system satellite message.

In one embodiment, the common data comprises time-of-week (TOW) information as provided in GPS satellite messages. As such, since TOW is provided approximately in each subframe (i.e., every 6 seconds, as shown in FIG. 2A), in one embodiment of the invention, the TOW value is repeatedly estimated by summing across the TOW data provided by each of a number of satellite vehicles as described above; "adjacent" (e.g., at time n and n+1) TOW data is then checked for consistency. This is described in further detail below with reference to FIG. 5 and one embodiment of the invention.

At 110, based on the effect(s) of the combining common portions of one SV signal and/or common portions between two or more SV signals, the entity determines navigational information. The navigational information may include one or a combination of time, position of the entity, velocity, range to a satellite, range to a basestation, and/or other information.

It should be emphasized that intra-SV and inter-SV processing, as described above, may be performed separately or in combination. As such, in one embodiment, only intra-SV signal processing is performed by combining common portions contained in one SV signal associated with at least a portion of an SV data message. In an alternative embodiment, only inter-SV processing is performed by combining common portions between two or more SV signals, each associated with at least a portion of an SV data message. In yet another embodiment, a combination of intra-SV and inter-SV processing is performed. In still another embodiment, a selection is made based on some condition (e.g., the number of satellites in view, SNR, etc.) whether to use intra-SV or inter-SV signal processing and/or to derive a result obtained from intra-SV and inter-SV signal processing.

Overview of a Typical GPS Satellite Signal Format

To aid in the understanding of the present invention, a description of the format of a typical GPS system satellite message is provided below. FIG. 2A depicts the structure of a (standard positioning service) GPS system satellite message. Shown in FIG. 2A is a satellite message 212, which spans 12.5 minutes and comprises 25 frames. Each of the 25 frames, such as the frame 214, spans 1/25 of 12.5 minutes or 30 seconds, and is comprised of five subframes. In turn, each of the five subframes, such as the subframe 216, spans 1/5 of 30 seconds or six seconds, and is comprised of ten words. Finally, each of the ten words, such as the word 218, spans 1/10 of 6 seconds or 0.6 seconds and 30 bits.

Most of the information in the first three subframes of the 30 second frame are associated with position information of the individual transmitting satellite (i.e., the satellite vehicle that is transmitting the message). The latter two subframes of the 30 second frame include, among other information, so-called Almanac data which provides coarse satellite position information for the full constellation of GPS satellites. The data in the first three subframes typically repeats over consecutive frames (i.e., every 30 seconds). On the other hand, since it typically takes 12.5 minutes to transmit the entire Almanac, the data in the last two subframes change between frames. An exception is the TOW word, which is incremented by one count every subframe (i.e., every six seconds).

In general, a GPS signal may be regarded as a data signal at 50 baud with data transmitted by binary phase shift keying (BPSK), wherein each data baud is multiplied by 20 repetitive frames of a second high speed binary "spreading" sequence. Each frame of the spreading sequence has a length of 1023 binary (e.g., +1 or −1) symbols with a symbol (or "chip") rate of 1.023 Million symbols per second (Msps).

In general, a GPS receiver synchronizes to the high speed spreading sequence and removes it from the received satellite signal. The removal of the spreading sequence collapses the satellite signal to a relatively narrower 50 baud data sequence, which in turn should be demodulated. In the following description, it may be assumed that the spreading sequence has been removed.

It should be appreciated that at least some of the transmitted data sequence of a satellite message is not common to the source information (e.g., ephemeris, time-of-day, etc.) represented by the message. Rather, the transmitted data sequence represents a coded version of the source data/information (hereinafter, "transmitted data/bits" refers to the coded version of the "source data/bits"). Typically, a Hamming-type code is utilized which allows error detection (e.g., parity checking). To this end, each of the transmitted 30 bit words of the GPS satellite message comprise 24 data bits and 6 parity bits. This allows errors of three bits or less to be detected. The coding method, however, actually affects all of the transmitted bits, since the last transmitted bit (i.e., parity bit 30) of a previous (N−1)th word is exclusive-OR'd with the 24 information bits of a current Nth word.

It should also be noted that data bits 293 and 294 of the subframe are chosen such that the last two parity bits of the subframe (bits 299 and 300) are both equal to zero. As such, these bits have no effect on the subsequent word, as they would if they were sometimes nonzero. Accordingly, the first word of a subframe is decoupled from the last word of the previous subframe.

FIG. 2B illustrates the GPS coding equations generally used to code source data (e.g., ephemeris). In FIG. 2B, the data bits $d_1, d_2, \ldots d_{24}$ represent the source data, while $D_1, D_2, \ldots D_{30}$ represent the transmitted (or coded) bits of a current (or Nth) word as transmitted by an SV. Bits $D_{25}, \ldots D_{30}$ represent computed parity bits. The symbol "*" is used to identify bits of a preceding or (N−1)th word transmitted by the SV. The symbol "⊕" represents the modulo-2 summation or exclusive-OR operation.

For the most part, the d quantities repeat (i.e., remain unchanged) from one frame to another. However, as shown in FIG. 2B, since the D quantities are formed from the exclusive-OR of the corresponding d quantities with the last transmitted parity bit of the previous word, the D quantities may not repeat between frames. In fact, the last parity bit ($D_{30}$) generally varies from word to word and from frame to frame, since a given $D_{30}$ depends upon all of the data of the subframe due to its dependency on $D_{29}$*. Thus, the transmitted data sequence $D_1, D_2, \ldots D_{24}$ of a given word does not in general repeat from one frame to the next, but may be somewhat randomly inverted according to the last parity bit ($D_{30}$*) of the previous word. There are, however, instances wherein this data does repeat, such as the first word of a subframe which contains fixed synchronization data and in which $D_{30}$* is zero.

Overview of One Aspect of the Invention

Differential Demodulation

As mentioned above, the transmitted data sequence $D_1, D_2, \ldots D_{24}$ of a given word does not in general repeat from one frame to the next. However, according to one aspect of the invention, the sensitivity of an entity, such as a mobile or non-mobile GPS receiver, is improved by finding repetition within (at least a portion of) the GPS satellite message. In one embodiment of the invention, sampled data from a satellite signal associated with a satellite message (or portion thereof) is summed from one frame to the next following differential demodulation. According to one aspect of differential demodulation, a given data sample is multiplied by a previous data sample to remove the effects of slowly varying signal phase. As a result, the underlying information bits are logically combined according to the exclusive-OR (XOR) operation.

It should be appreciated that differential demodulation and summation of common data may be performed upon sampled data that is quantized according to several bits of accuracy. The retention of such accuracy may be desirable in some instances to preserve the signal fidelity, since the signal generally includes noise and other distortions in addition to information that is of interest.

Figure 3:
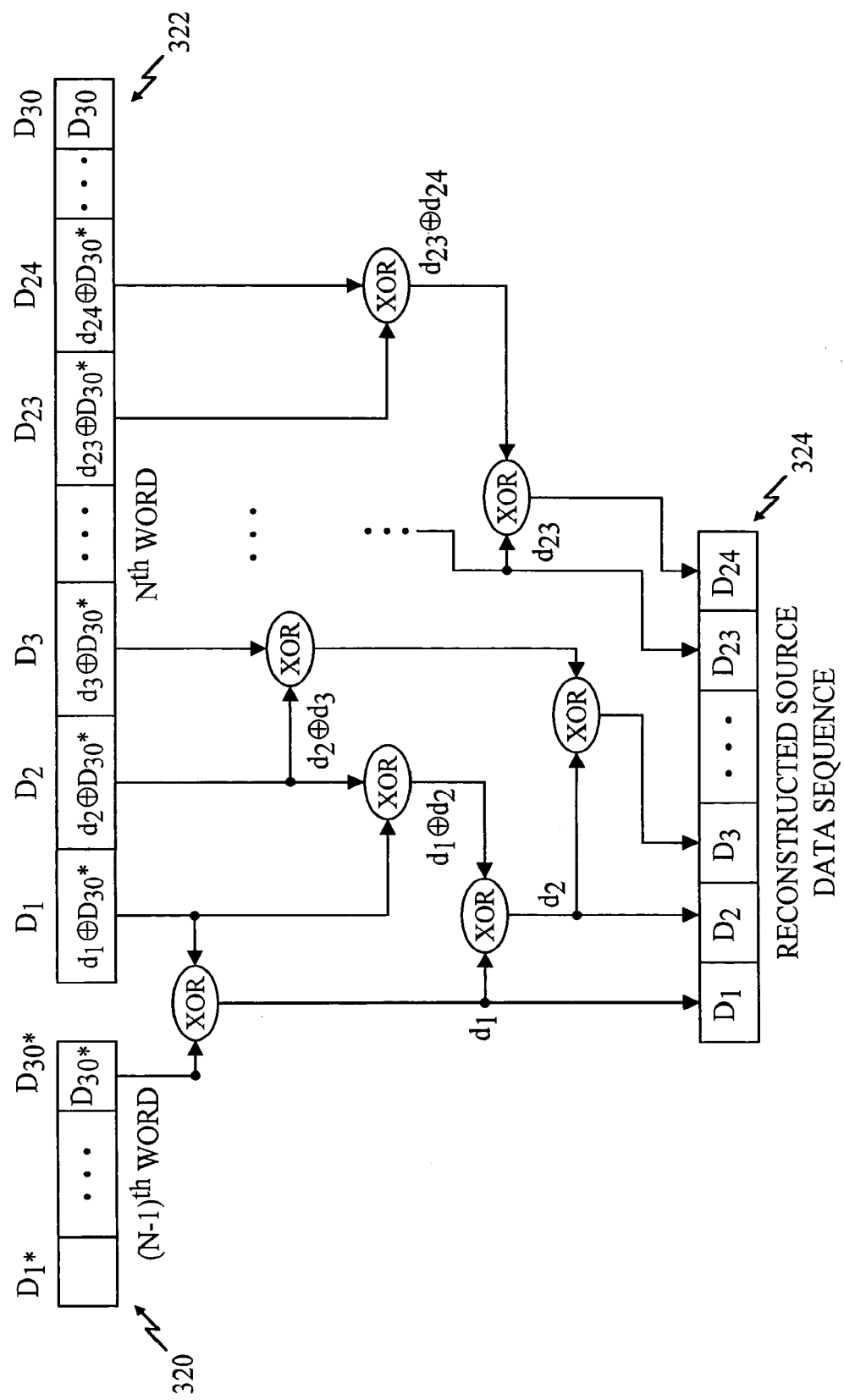
FIG. 3 is a data flow diagram illustrating the XOR operation associated with differentially demodulating a satellite message (or portion(s) thereof) according to one embodiment of the invention.

Hereinafter, multilevel quantized processed data is termed "soft decisions." When a subsequent (which may be final) determination is made as to the value (e.g., logical "1" or "0") of an information bit of the soft decision data, such a subsequent determination is hereinafter referred to as "hard decision" data. FIG. 3 is a data flow diagram illustrating the logical operations that result from differentially demodulating a signal associated with a satellite message (or portion(s)

thereof) according to one embodiment of the invention. As shown in FIG. 3, a transmitted data bit of a previous or (N−1)th word 320 is combined with transmitted data of a current or Nth word 322. In particular, according to the method depicted by FIG. 3, the last parity bit of the (N−1)th word 320 is combined by an XOR operation with the first transmitted bit of the Nth word 322, to produce $D_{30}* \oplus D_1$; according to the coding equations of FIG. 2B, $D_{30}* \oplus D_1$ is the same as $D_{30}* \oplus d_1 \oplus D_{30}*$. As a result of the XOR operation, $D_{30}*$ cancels out; that is $D_{30}* \oplus d_1 \oplus D_{30}* = d_1$. Similarly, the first and the second transmitted bits ($D_1$ and $D_2$, respectively) of the Nth word 322 are (XOR) combined to generate a second result—namely $d_1 \oplus d_2$.

The above-described process is continued to generate the sequence $d_1, d_1 \oplus d_2, d_2 \oplus d_3, \ldots d_{23} \oplus d_{24}$. It should be appreciated that the data sequence—namely $d_1, d_1 \oplus d_2, d_2 \oplus d_3, \ldots d_{23} \oplus d_{24}$—does repeat from frame to frame since it does not contain the parity bit $D_{30}*$. To reconstruct the source data sequence $d_1, d_2, \ldots d_{24}$, which is depicted in FIG. 3 by a reconstructed source data sequence 324, the adjacent samples of the above described sequence $d_1, d_1 \oplus d_2, d_2 \oplus d_3, \ldots d_{23} \oplus d_{24}$ are combined by a pair-wise XOR operation, as also shown in FIG. 3. For example, the first two adjacent samples—$d_1$ and $d_1 \oplus d_2$—may be combined to obtain $d_1 \oplus d_1 \oplus d_2$ which equals $d_2$. The result $d_2$, in turn, may be combined with the next adjacent sample of the sequence $d_1, d_1 \oplus d_2, d_2 \oplus d_3, \ldots d_{23} \oplus d_{24}$ namely $d_2 \oplus d_3$—to obtain $d_2 \oplus d_2 \oplus d_3 = d_3$. In this manner, the source data sequence $d_1, d_2, \ldots d_{24}$ may be obtained.

Also provided below is a mathematical description of differential demodulation, as utilized in one embodiment of the invention. Samples of the transmitted satellite signal (or portion thereof) may be represented by:

$$s(n) = D(n) \times \exp(j\theta_n), \text{ for } n = 0, 1, 2, \ldots,$$

wherein θ is an unknown, but is a relatively slowly varying phase angle (and the sample rate may be equal to the data rate) and D(n) are the satellite data message symbols with amplitudes of +A or −A (wherein A is a constant depending on signal strength), and wherein the polarity indicates logical 0 or 1, respectively. (According to one embodiment, relatively precise data synchronization and frequency tracking of the carrier are assumed, along with relatively poor phase tracking.) To the quantity s(n) is typically added random noise and interference, but description of such is not necessary for understanding of the invention.

As mentioned above, differential demodulation may be thought of as combining (e.g., by multiplying) a current data sample(s) with a previous (or delayed) data sample(s) (or complex conjugate thereof), such that:

$$\begin{aligned} r(n) &= s(n)s(n-1)^* \\ &= D(n)D(n-1) \times \exp(j(\theta_n - \theta_{n-1})) \\ &= D(n)D(n-1) \times \cos(j(\theta_n - \theta_{n-1})) + \\ &\quad jD(n)d(n-1) \times \cos(j(\theta_n - \theta_{n-1})) \\ &\cong D(n)D(n-1) \end{aligned}$$

wherein only the cosine (or "inphase") term is retained, and the approximation generally holds for $\theta_n \approx \theta_{n-1}$. Typically, if the carrier frequency is known or tracked (e.g., to an accuracy greater than the data rate), the above approximation for the differential demodulation will hold.

It should be appreciated that the full numerical accuracy of the real part of r(n) of the above equation (s) is generally retained when adding the value of r(n) corresponding to a given frame with that of successive frames. This "full accuracy" data is sometimes referred to as "soft decision" data since it has not yet been mapped to logical values of 0 and 1. Upon such summation of a number of frames, the sign of the in-phase term is retained. The sign of the in-phase term is sometimes referred to as "hard decision" values. As mentioned above, combining data, which, in this case corresponds to frame summation, may improve the SNR of the demodulated data r(n) when such data is common (e.g., identically repeated, at least in part) from frame to frame.

In an alternative embodiment, hard decisions are performed on the r(n) value prior to summation (i.e., rounding r(n) to +1 or −1). As a result, however, there may be a loss in sensitivity of the SPS receiver of approximately 2 dB.

In one embodiment, if the SNR of the satellite data message is not constant, but has fluctuation to a degree above a predetermined (or adaptive) threshold, a weighted sum of the soft-decision data is utilized, wherein the weighting factor is proportional to the square-root of the SNRs. Thus, for example, if the noise level is constant, and if frames of data are received by the entity such that a first frame is stronger than a second by 6 dB, the first frame samples could be summed with two times the second frame samples. The sign of the weighted sum becomes the hard decision data. Such an approach may decrease, and even minimize, the probability of error associated with processing the satellite signal(s).

It should be appreciated that there are several techniques for determining noise level. For example, in one embodiment, noise level is estimated by observing the jitter in the (received) signal amplitude. In alternative embodiments, other known techniques for noise detection/measurement may be utilized.

It should be noted that differential demodulation, as described above, may be especially useful for increasing sensitivity of a satellite positioning receiver when the SNR is relatively low, such that relatively accurate tracking of the signal phase may not be possible or practical. However, when the SNR is relatively high, other techniques, such as coherent summation, may provide relatively better results. For example, if the value of the parity bit $D_{30}*$ can be estimated, then the value may be used to reverse the polarity of the data in the following subframe. As a result, coherent summation may be performed between the resulting data with corresponding data in subsequent frames.

Thus, in one embodiment, a satellite positioning receiver utilizes differential demodulation which would generally be better suited for relative low SNR situations, as well as another technique (e.g., coherent modulation) that is generally well-suited for relatively high SNR situations. In one embodiment, depending on the SNR as computed by the receiver, the appropriate signal processing technique is selected to process the satellite signal(s). Alternatively, in one embodiment, differential demodulation and at least one other technique are both performed, and based on a predetermined criteria or set of criteria (e.g., SNR, relative error, etc.), the result of one of the techniques is selected.

Overview of One Aspect of the Invention

Error Detection Based on Differential Demodulation

As described above, the source data bits $d_1, d_2, d_3, \ldots d_{24}$ may be determined by differential demodulation and frame summation. Once the source data bits are determined, it may be desirable to perform parity checking to detect errors. For example, such parity checking may be performed by forming linear combinations of the source data bits and determining whether such combinations are commonly equal to zero. However, the combinations of the source data bits cannot directly be substituted into the equations of FIG. 2B, since the XOR combination of the adjacent equations have been obtained, as described above, thus "destroying" the last six parity equations (i.e., $D_{25}$ through $D_{30}$) of FIG. 2B.

Furthermore, examination of the equations of FIG. 2B shows that the parity bits $D_{29}*$ and $D_{30}*$ present in these last six equations (i.e., $D_{25}$ through $D_{30}$) generally vary from word to word. Thus, differential demodulation, wherein adjacent/successive samples are combined, generally will not provide a gain via subsequent frame summation of the parity equations. For instance, the XOR combination of $D_{25}$ and $D_{26}$, produces a term which includes the factors $D_{29}*$ and $D_{30}*$, which as stated above, generally vary randomly from one frame to the next. Thus, the frame-by-frame summation of the quantity $D_{25}$ and $D_{26}$ could produce ambiguous results.

According to one embodiment of the invention, error detection is performed using differential demodulation of data samples that are non-adjacent/non-successive (i.e., having at least one bit period space therebetween). For example, with reference to the equations of FIG. 2B, the XOR combination of $D_{24}$ and $D_{26}$ will produce the sequence $d_2 \oplus d_3 \oplus d_4 \oplus d_6 \oplus d_7 \oplus d_{11} \oplus d_{12} \oplus d_{13} \oplus d_{14} \oplus d_{15} \oplus d_{18} \oplus d_{19} \oplus d_{21}$, since both $D_{24}$ and $D_{26}$ contain the parity bit $D_{30}*$, which cancels out. Thus, sample data containing $D_{24} \oplus D_{26}$ may be averaged for successive frames to generate unambiguous results. As such, a single error in any of the source data terms (i.e., d terms) of $D_{24} \oplus D_{26}$ may be detected.

In a similar fashion, differential demodulation producing non-successive pair-wise (XOR) combinations of several sets of the remaining last D terms (e.g., $D_{25}$ and $D_{30}$) may be used to produce error control equations that do not depend on somewhat randomly varying values, such as $D_{29}*$ or $D_{30}*$. According to one embodiment of the invention, to detect a single error, in general, differential demodulation using appropriate sample spacing is performed to generate terms containing all of the 24 source data bits (i.e., $d_1, d_2, d_3, \ldots d_{24}$). In one embodiment, this is accomplished by performing differential demodulation to produce the non-successive combinations, producing $(D_{24} \oplus D_{26})$, $(D_{25} \oplus D_{27})$, $(D_{26} \oplus D_{28})$, and $(D_{27} \oplus D_{30})$. In alternative embodiments, other combinations and/or terms, or nested combinations, may be utilized to generate all of the 24 source data bits (i.e., $d_1, d_2, d_3, \ldots d_{24}$) to detect error. As described above, differential demodulation is followed, in one embodiment, by frame summation of common signal samples.

In an alternative embodiment, another method for error detection is performed. In particular, in this alternative embodiment, sampled data containing one of the parity bits $D_{29}*$ and $D_{30}*$ is multiplied by sample data containing an appropriate one of the set of bits $D_{25}$ and $D_{30}$. For example, a sample containing $D_{29}*$ is multiplied by a sample containing $D_{25}$, which contains $D_{29}*$, while a sample which contains $D_{30}*$ is combined with one containing $D_{26}$, which contains $D_{30}*$. In these two cases, the multiplication of the samples results in the XOR of the corresponding terms, thereby removing $D_{29}*$ and $D_{30}*$ from the respective equations. To perform such error detection, the location of the beginning and/or end of each word in the satellite message (or portion thereof) should be determined. In one embodiment, the telemetry word of each subframe, which contains a fixed data pattern, may be utilized to perform such data boundary synchronization.

In yet another embodiment, a method to detect error in the portions of data that repeat, for example, from frame to frame, is provided. According to this method, the result of the differential demodulation and summation for two separate sets of frames of data are compared to determine whether they are common.

In yet another embodiment, the presence of relatively high error rate is determined by estimating, by according to one or a combination of the methods described herein, the eight synchronization preamble bits that occur at the beginning of each subframe to determine whether the value of these bits equal the prior known eight bit pattern.

Overview of One Embodiment of the Invention

Combining Common Information Associated with a Satellite Vehicle Signal

Figure 4:
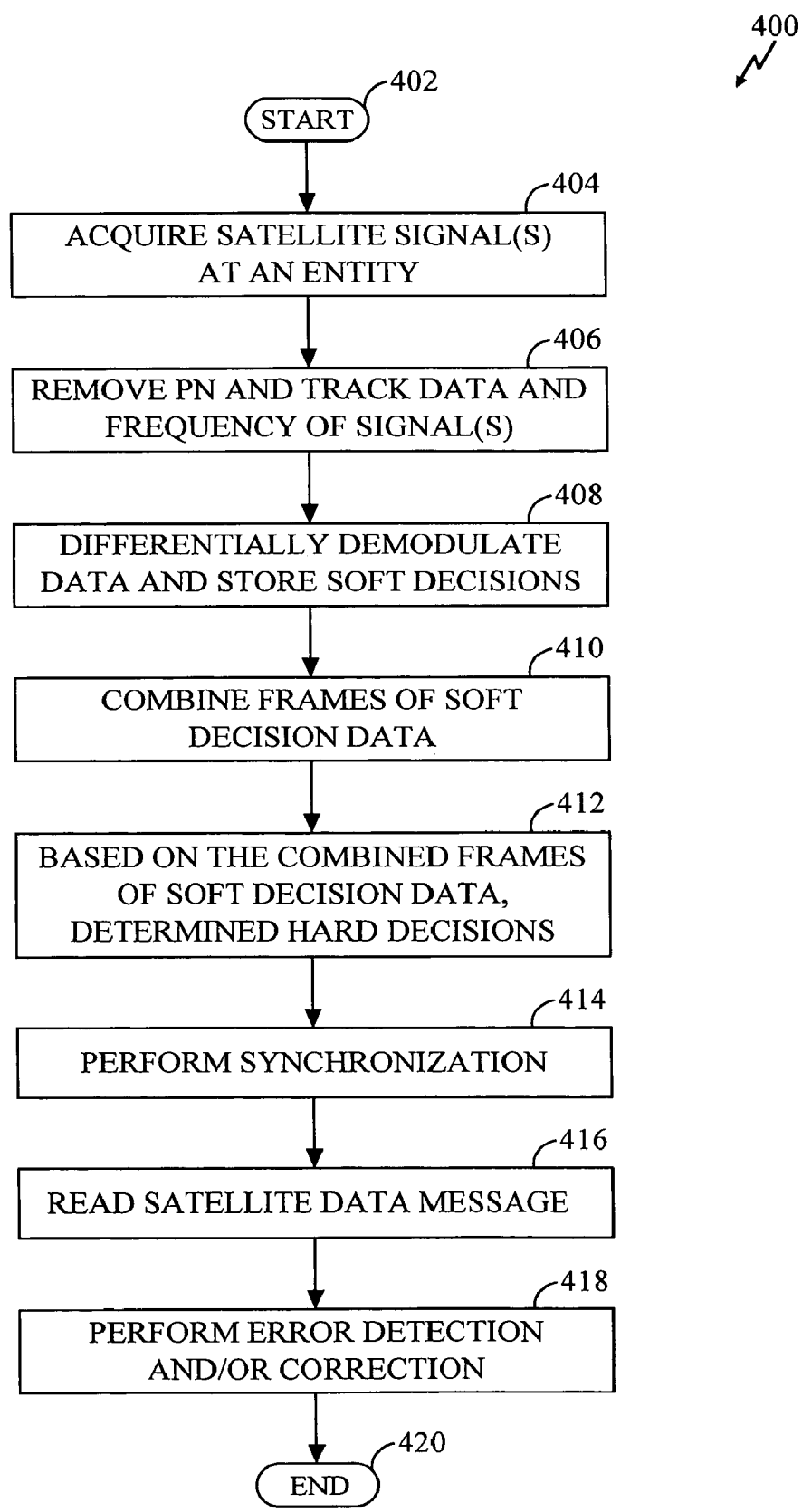
FIG. 4 is a flow diagram illustrating a method for processing portions of at least one satellite message, according to one embodiment of the invention.

FIG. 4 is a flow diagram illustrating a method for processing portions of at least one satellite message, according to one embodiment of the invention. To provide an understanding of the method 400 shown in FIG. 4, it is assumed that PN tracking, data tracking and frequency tracking are performed at least for a portion of the satellite signal processing interval for at least one SV signal, which is assumed to be M frames. In one embodiment, the method 400 described with reference to FIG. 4 is performed for each satellite signal that can be tracked.

In FIG. 4, flow begins at 402 and ends at 420. At 404, at least a portion of a satellite signal is acquired by an entity. The entity may be a mobile or stationary satellite positioning receiver. In one embodiment, the entity is a mobile GPS receiver. In one embodiment, the entity may further provide other features, such as cellular or other types of communication or data processing features.

At 406, the acquired signal(s) is despread, by removing the PN, and the data and frequency of the received signal are tracked. One or more well-known techniques for data and frequency tracking may be employed.

At 408, the signal is differentially demodulated and soft decisions associated with the differential demodulation are stored. As described above, differential demodulation (with delay equal to one sample period) of the satellite message (or portion thereof) involves multiplying an Nth sample with a previous or (N−1)th sample. Soft decisions means that the voltages, rather than signal polarity (i.e., hard decisions), are stored at this point in the satellite signal processing method. In one embodiment, wherein complex signal representation is utilized, the soft decisions retain only the in-phase components of the data.

Figure 5:
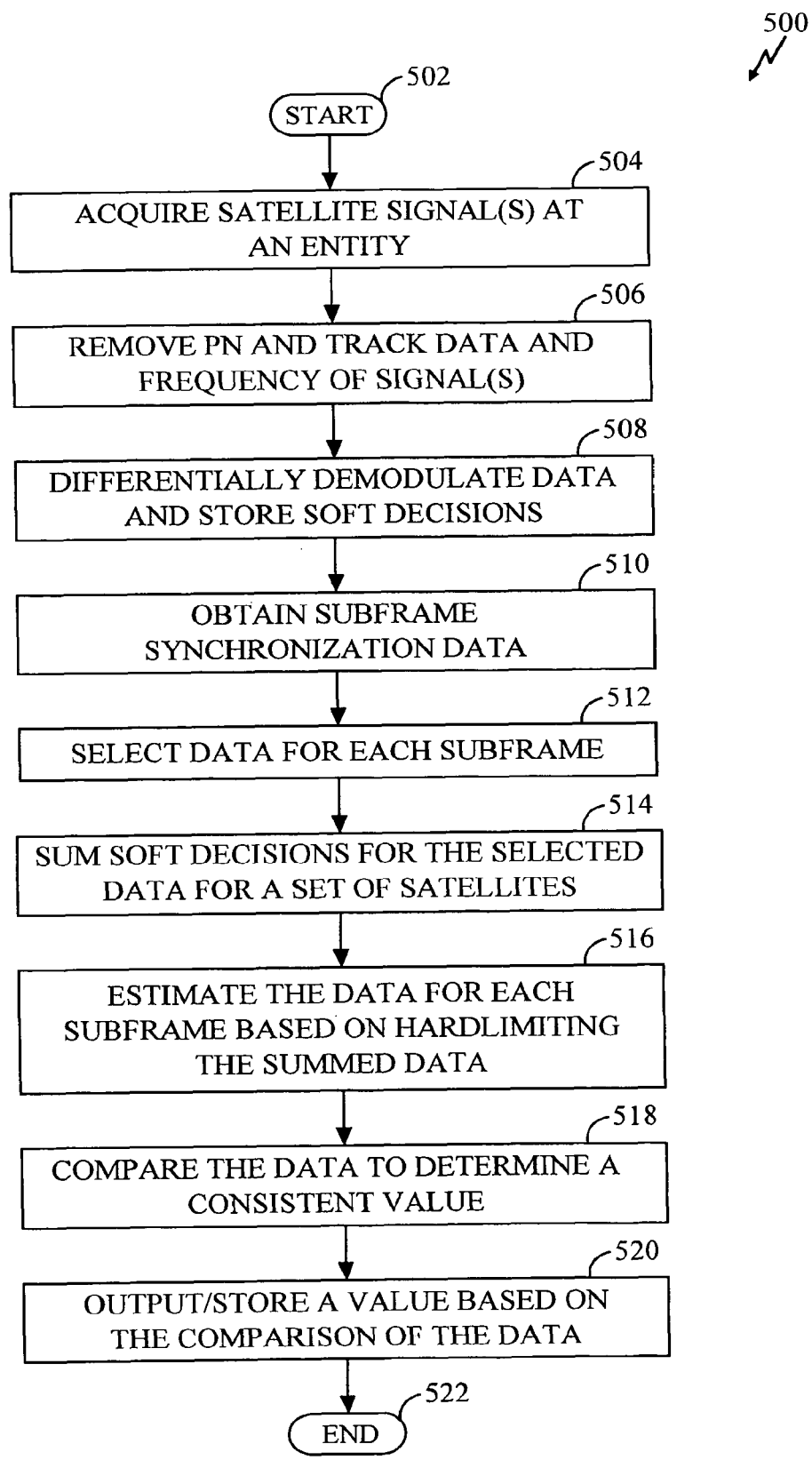
FIG. 5 is a flow diagram illustrating a method for processing satellite positioning signals based on common information across two or more SV signals, according to one embodiment of the invention.

At 410, frames of soft decision data (which in one embodiment corresponds to voltages) are combined (e.g., summed in one embodiment). In the case where the satellite message is in the GPS format described with reference to FIG. 2A, the summation involves adding together voltages that correspond to words that are spaced by 1500 bit periods (i.e., 30 seconds per frame multiplied by 50 baud). Thus, if it is assumed for illustrative purposes that the signal processing interval for the method of FIG. 5 is M frames, then M such spaced voltages are summed for each of the 1500 bit periods corresponding to one frame.

At 412, hard decisions for the in-phase components are determined based on the polarity of the voltages of the combined frames of soft decision data.

At 414, synchronization is performed. In one embodiment, the synchronization is performed at the subframe level (refer to FIG. 2A), based on an eight bit synchronization pattern indicated by a telemetry word, which typically occurs in the first word of each subframe. The synchronization pattern, in general, occurs every six seconds, and thus, for the example provided above, will occur five times over the 1500 bit frame period. Such synchronization information may be used to define the "location" of each subframe, and in particular, the data (e.g., frame) boundaries.

By determining the boundaries, the satellite data message may be "read" in 416. However, the satellite data following the above-described summation operation (e.g., at 410) may still be coupled, for example, in the format $d_1$, $d_1 \oplus d_2$, $d_2 \oplus d_3$, ... $d_{23} \oplus d_{24}$. As noted above with reference to FIG. 3, successive pair-wise modulo-2 or XOR combination may be performed to decouple the data to obtain the source data sequence $d_1$, $d_2$, $d_3$, ... $d_{24}$.

In another embodiment, the TOW summation between multiple SV messages, as described below, may utilize the synchronization pattern to estimate time (e.g., time of day) and/or other information.

Finally, at 418, error detection is performed, as described previously.

In one alternative embodiment, if relatively high SNR is detected, an alternative method for processing the satellite signal—which may be employed in lieu of or in conjunction with differential demodulation and/or time data summation across a set of SVs—may be employed. For example, in one embodiment, the fact that the first 24 bits of an Nth word of a GPS satellite message (i.e., bits $D_1$ through $D_{24}$ of FIG. 3) are phase inverted in accordance with the last parity bit of the preceding (N−1)th word (i.e., bit $D_{30}$* of FIG. 3) allows "decision directed" demodulation. In this embodiment of the invention, the phase of the parity bit is estimated, and the estimation is utilized to remove the phase inversion. As such, the phase of the incoming signal is coherently tracked (e.g., with a Costas loop), and thus, the sign of the parity bit may be used to estimate its phase. Assuming that $s_{30}$*, $s_1$, $s_2$, ... $s_{24}$ are signal samples that contain the data $D_{30}$*, $d_1$, $d_2$, ... $d_{24}$, then, by determining or estimating this phase, a statistic, such as $\text{sign}(s_{30}^*) \times [s_1 \ldots s_{24}]$ or $s_{30}^* \times [s_1 \ldots s_{24}]$, may be used to remove the sign inversion and allow summation of succeeding frames of data with one another.

Overview of One Embodiment of the Invention

Combining Common Information Across Multiple SV Signals

As mentioned above, another technique—namely, summation of signals (or portions thereof) from multiple SVs and having common information associated therewith (e.g., information associated with the same instance of time—e.g. by specifying the same instance of time)—may be employed separately or in conjunction with the above-described frame summation techniques to improve the sensitivity of an entity, such as a satellite positioning receiver, when processing satellite positioning signals.

FIG. 5 is a flow diagram illustrating a method for processing satellite positioning signals based on common information across two or more SV signals, according to one embodiment of the invention. The method 500 of FIG. 5, as well as those described above, may be performed by several types of satellite positioning devices, such as stand-alone SPS receivers, integrated SPS receivers, which may provide communications and/or other data processing functionality, etc. In the method 500 shown in FIG. 5, flow begins at 502 and ends at 522. In general, 504, 506, and 508 of FIG. 5 are analogous to 404, 406, and 408, respectively, of FIG. 4. However, in the method 500, at least two satellite signals are acquired at 504, whereas at 404 of the method 400 described with reference to FIG. 4, one (or more) SV signals may be acquired.

At 510, subframe synchronization is performed/obtained. As described above, the subframe synchronization data may be obtained using the synchronization sequence of the telemetry word and/or other techniques.

At 512, for each subframe, common data is selected from each of a set of satellite messages (or portions thereof) received from two or more satellites (SVs). In one embodiment, signal samples containing the 17 bits comprising TOW information are selected from each successive subframe.

At 514, the common soft decision data for two or more received satellite signals for each subframe are summed together. For example, if signals from five satellites are processed, a gain in SNR of up to 5 (or approximately 7 dB) may be obtained. It should be appreciated that any number of "in view" SV signals may be used in such a summation.

At 516, the common data for each subframe is estimated by hardlimiting (i.e., retaining the polarity of) the summed bits. For example, in one embodiment where the common data includes time data consisting of TOW information, which is 17 bits as mentioned above, the result of the hardlimited estimation would be 17 bits.

At 518, the summed data from one subframe (and/or other portion of a satellite message) is compared to that corresponding to other subframes to determine a consistent value. For example, if TOW data is being used, as described with reference to one embodiment of the invention, and if the estimated TOW values are error free, then successive TOWs should only differ by a count of one. Thus, in one embodiment, a number of estimated TOWs determined over an interval of time are processed to determine a final value for the TOW based on consistency between the various TOW values. Different thresholds could be predetermined for the number or percentage of consistent data (e.g., TOW) values. For example, if 60% is the threshold in one embodiment, then if five SV TOWs are being processed, at least three should be consistent with each other (i.e., indicate the same time for corresponding TOW words). On the other hand, to achieve a relatively smaller error rate, the threshold may be set to 100%, such that all of the processed SV signals should be consistent with each other with respect to the processed data, such as TOW.

At 520, the (consistent) value determined at 520 is output or stored. The value may be associated with time, as described with reference to an embodiment wherein TOW information is determined and, as such, may be used, for example, to determine other information, such as the position of the entity (e.g., mobile/stationary GPS receiver) that is processing the satellite positioning signal(s).

Hardware Overview

The invention, in its various embodiments, may find use in a number of devices used to process satellite positioning systems, especially mobile receivers which may experience relatively low SNRs when processing satellite positioning signals.

Figure 6:
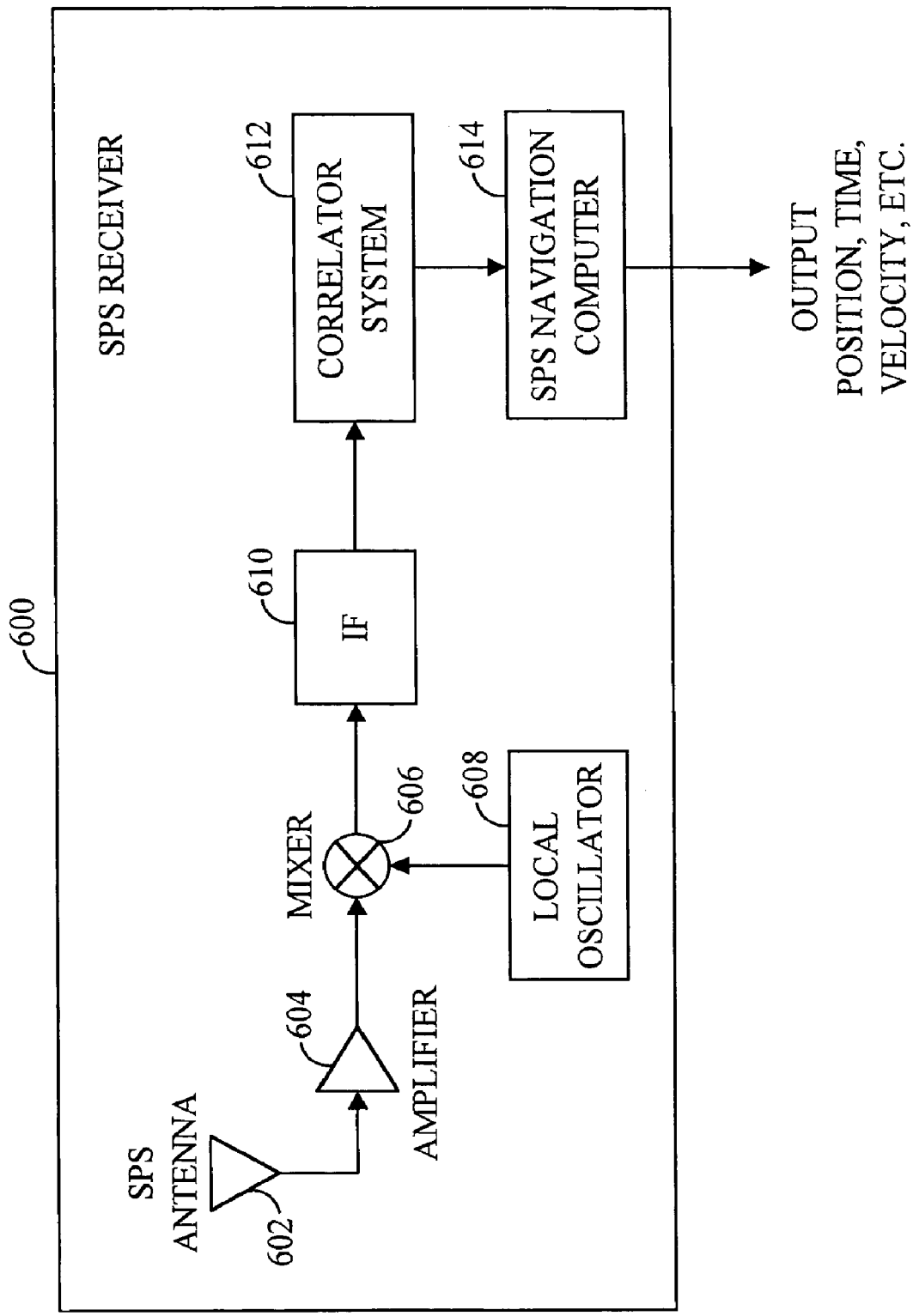
FIG. 6 is a block diagram of an SPS receiver to provide satellite positioning signal processing according to one or more embodiments of the invention.

FIG. 6 is a block diagram of an SPS receiver to provide satellite positioning signal processing according to one or more embodiments of the invention. The receiver 600 shown in FIG. 6 includes an antenna 602 to receive SPS signals. The SPS signals are provided from the antenna 602 to an amplifier 604, which amplifies the SPS signals. The amplifier 604 provides the amplified signals to a mixer 606, which is fed by a local oscillator 608. The mixer 606 produces down-converted SPS signals which are processed by a intermediate frequency RF stage 610 and provided to a correlator system 612. The correlator system 612 is coupled to a SPS navigation computer 614, which typically controls the operation of the correlator system 612 and, possibly the local oscillator 608, such that SPS signals are acquired and tracked, and information, such as satellite ephemeris data is read from the SPS signals. Such information may include and/or be used to determine various navigational information, including the position of the receiver 600, a reference time (e.g., GPS time), etc. The receiver 600 may be used in accordance with the present invention to combine common information between two or more portions of one or more satellite messages to determine navigational information in the portions, such as time, position, etc. As such, the navigation computer 614 may include a number of functional units to perform one or more of the above-described processing techniques. For example, in one embodiment, the navigation computer 614 may include a demodulation unit to demodulate (e.g., differentially, coherently, etc.) satellite signal samples, as well as a summing unit to sum such samples. The navigation computer 614, and the functional units included therein, may be exclusively hard-wired or utilize a combination of hard-wired circuitry and machine-implementable instructions (e.g., microcode, machine language, etc.). In one embodiment, one or more such signal/data processing functional units may be implemented by a processor (e.g., a general purpose digital signal processing integrated circuit). Such a processor, in turn, may be connected to a memory, which may store data and/or routines for performing satellite signal processing according to the invention.

Figure 7:
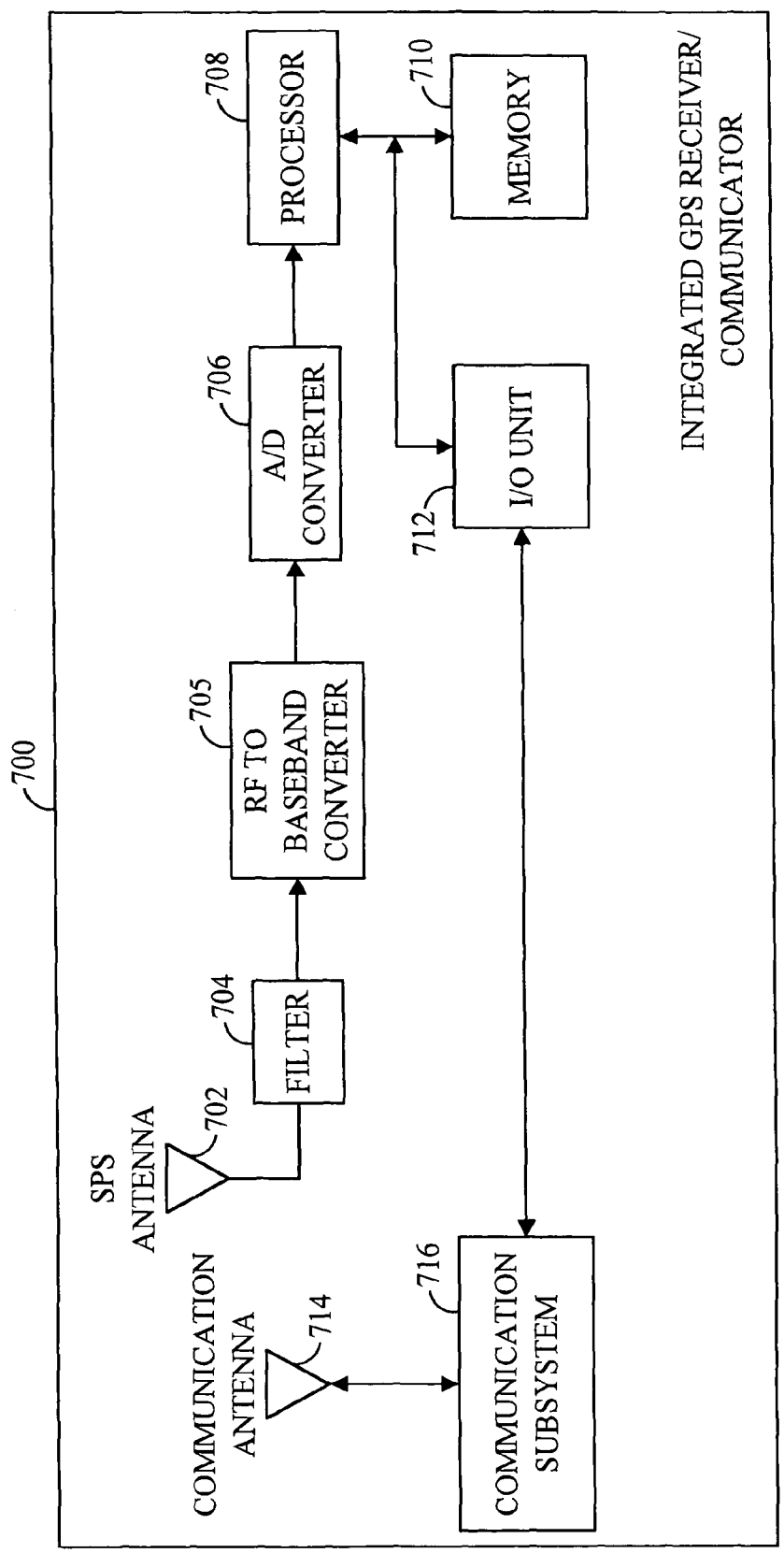
FIG. 7 is a block diagram of an integrated SPS receiver/communicator that may be utilized to process SPS signals, according to one embodiment of the invention.

FIG. 7 is a block diagram of an integrated SPS receiver/communicator that may be utilized to process SPS signals, according to one embodiment of the invention. The integrated mobile SPS receiver and communication system 700 shown in FIG. 7 may perform a particular form of digital signal processing on stored GPS signals in such a manner that the receiver has very high sensitivity, as described in U.S. Pat. No. 5,663,734, which was issued on Sep. 2, 1997, and is entitled "GPS Receiver and Method for Processing GPS Signals", and this patent is hereby incorporated herein by reference. This processing operation described in U.S. Pat. No. 5,663,734, typically computes a plurality of intermediate convolutions typically using fast Fourier transformations (FFTs) and stores these intermediate convolutions in the digital memory and then uses these intermediate convolutions to provide navigational information (e.g., at least one pseudorange). Furthermore, the system 700 may perform one or a combination of the techniques described above for combining common portions of one or more satellite signals to determine navigation information. In addition, the system 700 includes circuitry for providing communication between the system 700 and another entity.

As shown in FIG. 7, the system 700 includes two antennae: a SPS antenna 702 and a communication antenna 714. The SPS antenna 702 provides one or more SPS signals to a filter 704, which in turn filters the received SPS signals and provides it to an RF-to-baseband converter 705 which frequency translates the signal to a very low (or zero IF) carrier frequency. The RF-to-baseband converter 705 provides the signal to an analog-to-digital (A/D) converter 706. The A/D converter 706 provides digital representations of the received SPS signals to a processor 708. The processor 708 may be implemented by a general purpose programmable digital signal processing (DSP) integrated circuit (IC), a general purpose processor or microcontroller, or dedicated data processing circuitry. Typically, the processor 708 operates in conjunction with a memory 710 to process SPS signals according to one or more of the above-described techniques. For example, portions of one or more signals may be differentially demodulated and then combined by the processor 708 to determine navigational information. Such navigational information could be stored in the memory 710, provided to an input/output (I/O) unit 712, and/or be transmitted to another entity via a communication subsystem 716 and the communication antenna 714, which may provide digital and/or analog communication (e.g., via a cellular and/or satellite communication network). In one embodiment, the system 700 is a mobile unit that processes GPS signals according one or a combination of the above-described methods.

Figure 8:
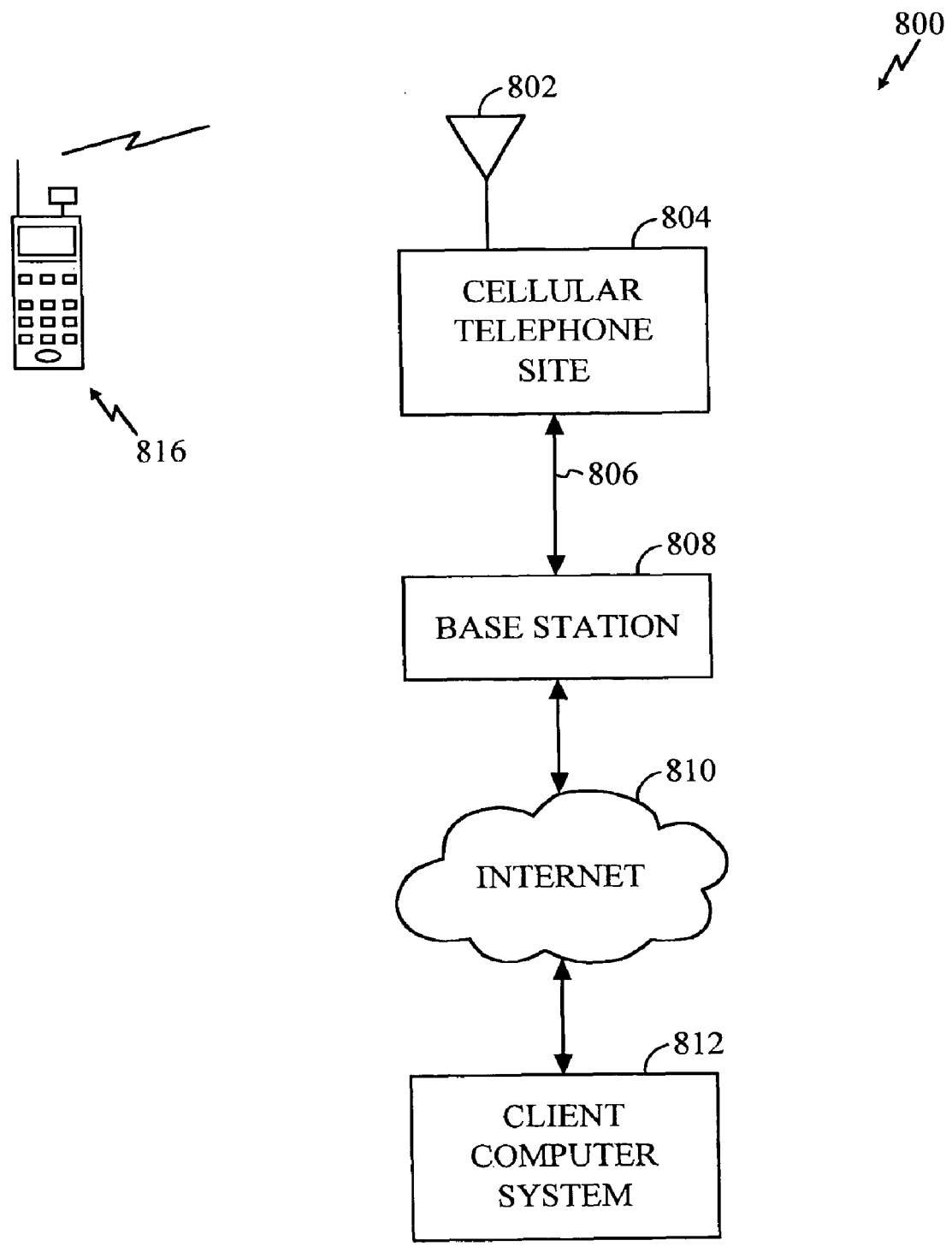
FIG. 8 illustrates a system according to one embodiment of the invention, which includes an SPS receiver, a cellular telephone site, a basestation, the Internet, and a client computer system.

FIG. 8 illustrates a system according to one embodiment of the invention, which includes an SPS receiver, a cellular telephone site, a basestation, the Internet, and a client computer system. The system 800 shown in FIG. 8 may operate, in one embodiment, in the following manner. A client computer system 812 will transmit a message through a network, such as an Internet 810 to a basestation 808. For example, the message may be a request for assistance. It should be appreciated that there may be intervening routers or computer systems in the network or Internet 810 which pass along the request for position of a particular mobile SPS receiver. The basestation 808 will then transmit a message through a link, which is typically, but not necessarily, a wired telephone link 806, to a cellular telephone site 804. This cellular telephone site 804 then transmits a command using its antenna or antennae 802 to the combined mobile SPS receiver and communication system 816. In response, the system 816 may transmit information back, such as pseudoranges, times associated with pseudoranges, latitude and longitude, and/or other information. Such information may be received by the cellular telephone site 804 and communicated back to the basestation through link 806.

The basestation may then determine and/or refine navigational information, such as time and/or position of the SPS receiver, and communicate the navigational information back to the SPS receiver and/or through a network, such as the Internet 810, to the client computer system 812 which may itself have mapping software at the client computer system, allowing the user of this system to see on a map the exact position of the mobile SPS system 816.

Alternative Embodiments

The above described techniques for combining portions of satellite message(s) may also be used with other types of SPS receiver architecture. For example, these techniques may be used with SPS receivers having architectures such as those described in co-pending U.S. Patent Application Ser. No. 60/037,904, filed Feb. 11, 1997 and co-pending U.S. Patent Application Ser. No. 60/050,647, filed Jun. 24, 1997 and co-pending U.S. patent application Ser. No. 09/021,854, now U.S. Pat. No. 6,289,041 filed Feb. 11, 1998.

While the invention has been described in terms of several embodiments, those skilled in the art will recognize that the invention is not limited to the embodiments described. Therefore, it should be understood that the method and apparatus of the invention can be practiced with modification and alteration within the spirit and scope of the appended claims. The description is thus to be regarded as illustrative instead of limiting on the invention.

The invention claimed is:

1. A method comprising:
at a mobile device, receiving a signal from a first satellite, the signal from the first satellite comprising a pseudorandom noise (PN) code portion and a navigation message portion both associated with the first satellite;

processing a first segment of the navigation message portion and a second segment of the navigation message portion, wherein the first segment and the second segment include common information, wherein processing the first segment of the navigation message portion and the second segment of the navigation message portion comprises checking consistency of common information in the first segment of the navigation message portion and the second segment of the navigation message portion and generating consistent common information therefrom;

subsequently accessing the consistent common information to determine position information of the mobile device.

2. The method of claim 1, wherein the common information comprises reference time information.

3. The method of claim 2, wherein the reference time information is a time of week (TOW), wherein the first segment of the navigation message portion is a first subframe and the second segment of the navigation message portion is a second subframe adjacent the first subframe.

4. The method of claim 3, wherein checking consistency of common information in the first segment of the navigation message portion and the second segment of the navigation message portion comprises checking that the TOW of the first subframe and the TOW of the second subframe differ by one.

5. The method of claim 3, wherein subsequently accessing the consistent common information to determine the position information of the mobile device comprises determining the time of week at a later subframe based on the TOW of the first subframe and the TOW of the second subframe.

6. The method of claim 1, wherein the position information of the mobile device comprises one or more pseudoranges.

7. The method of claim 1, wherein the position information of the mobile device comprises a position of the mobile device.

8. A method comprising:
at a mobile device, receiving a signal from a first satellite, the signal from the first satellite comprising a pseudorandom noise (PN) code portion and a navigation message portion both associated with the first satellite;
at the mobile device, receiving a signal from a second satellite, the signal from the second satellite comprising a pseudorandom noise (PN) code portion and a navigation message portion both associated with the second satellite
processing a first segment of the navigation message portion associated with the first satellite and a second segment of the navigation message portion associated with the second satellite, wherein the first segment and the second segment include common information, wherein processing the first segment and the second segment comprises checking consistency of common information in the first segment and the second segment and generating consistent common information therefrom;
subsequently accessing the consistent common information to determine position information of the mobile device.

9. The method of claim 8, wherein the common information comprises reference time information.

10. The method of claim 9, wherein the reference time information is a time of week (TOW), wherein the first segment of the navigation message portion associated with the first satellite is a first subframe and the second segment of the navigation message portion associated with the second satellite is a second subframe adjacent the first subframe.

11. The method of claim 10, wherein checking consistency of common information comprises checking that the TOW of the first subframe and the TOW of the second subframe differ by one.

12. The method of claim 10, wherein subsequently accessing the consistent common information to determine the position information of the mobile device comprises determining the time of week at a later subframe based on the TOW of the first subframe and the TOW of the second subframe.

13. The method of claim 8, wherein the position information of the mobile device comprises one or more pseudoranges.

14. The method of claim 8, wherein the position information of the mobile device comprises a position of the mobile device.

15. A mobile device comprising:
an SPS antenna to receive signals from one or more satellites, the signals from the one or more satellites comprising a pseudorandom noise (PN) code portion and a navigation message portion both associated with a particular satellite;
a processor to process a first segment of a navigation message portion associated with one of the one or more satellites and a second segment of the navigation message portion associated with one of the one or more satellites, wherein the first segment and the second segment include common information, wherein processing the first segment and the second segment comprises checking consistency of common information in the first segment and the second segment and generating consistent common information therefrom;
memory to store the consistent common information, wherein the processor is further configured to access the consistent common information to determine position information of the mobile device.

16. The mobile device of claim 15, wherein the position information comprises one or more pseudoranges.

17. The mobile device of claim 15, wherein the position information comprises a position of the mobile device.

18. The mobile device of claim 16, wherein the mobile device further comprises a communication subsystem to transmit the one or more pseudoranges to a network device.

19. A mobile device comprising:
means for receiving signals from one or more satellites, the signals from the one or more satellites each comprising a pseudorandom noise (PN) code portion and a navigation message portion both associated with a particular satellite;
means for processing a first segment of a navigation message portion associated with one of the one or more satellites and a second segment of the navigation message portion associated with one of the one or more satellites, wherein the first segment and the second segment include common information, wherein the means for processing the first segment and the second segment comprises means for checking consistency of common information in the first segment and the second segment and means for generating consistent common information therefrom;
means for storing the consistent common information;
means for accessing the consistent common information; and
means for determining position information of the mobile device.

20. The mobile device of claim 19, wherein the common information comprises reference time information.

21. The mobile device of claim 20, wherein the reference time information is a time of week (TOW), wherein the first segment is a first subframe and the second segment is a second subframe adjacent the first subframe.

22. The mobile device of claim 21, wherein the means for checking consistency of common information comprises means for checking that the TOW of the first subframe and the TOW of the second subframe differ by one.

23. The mobile device of claim 21, wherein the means for accessing the consistent common information to determine the position information of the mobile device comprises means for determining the time of week at a later subframe based on the TOW of the first subframe and the TOW of the second subframe.

24. The mobile device of claim 19, wherein the position information of the mobile device comprises one or more pseudoranges.

25. The mobile device of claim 19, wherein the position information of the mobile device comprises a position of the mobile device.

* * * * *